Patented July 18, 1933

1,918,623

UNITED STATES PATENT OFFICE

BRUNO WENDT, OF DESSAU IN ANHALT, GERMANY, ASSIGNOR TO AGFA ANSCO CORPORATION, OF BINGHAMTON, NEW YORK, A CORPORATION OF NEW YORK

MULTICOLORED PICTURES

No Drawing. Application filed June 2, 1930, Serial No. 459,016, and in Germany June 4, 1929.

My present invention relates to the manufacture of two- or multi-colored photographic pictures and more particularly to such a process in which esters of the leuco compounds of vat dyes are used.

According to the present invention, the esters and ester salts of leuco dyestuffs can generally be used with advantage for the production of two- or multi-colored pictures. With this process one starts from the usual component negatives taken behind a colored screen, a positive picture being finally obtained in a complementary color. The pictures may be prepared according to known methods on paper or in a transparent layer by printing the differently colored pictures over each other, fixing each of the pictures of an individual color before sensitizing the layer to print the second and third color sensations. The fixing operation is very simple, because the esters and the ester salts which have not been altered by light can be removed from the picture by means of suitable solvents, such as alcohol or water, particularly well by means of distilled water.

Another working method consists in first preparing the individually colored pictures in separate processes and superimposing them subsequently.

As the esters of the leuco compounds are mostly colorless, and consequently absorb in the ultra-violet, the mercury vapor lamp can advantageously be used as the source of light. The sensitized layer may be exposed either dry or moist and its sensitiveness may be increased by adding a substance having an oxidizing action in the light, for instance, organic nitro-compounds, or collodion.

If colloids, liable to be hardened, such as gelatin, are used as the vehicle or binding medium for the sensitive ester or ester salts, the layer, when exposed, is hardened simultaneously with the formation of the dye, this hardening effect being likewise useful in practice, for instance, in preparing washout reliefs.

When used for photographic purposes the esters and ester salts of the leuco compounds have, as compared with the ordinary leuco compounds, the appreciable advantage that they are not affected by air in the dark; at the same time, they possess the high sensitiveness peculiar to nearly all leuco compounds.

A further important advantage of this process is the fact that leuco esters and salts of leuco esters of dyes having the highest fastness against light, can be used, so that the pictures produced may have a fastness hitherto unobtainable by other processes.

As compared with the colored pictures obtained with the aid of other dyestuffs, those obtainable according to the present invention excel by reason of their brilliant colors.

As suitable leuco esters to be used according to my invention, I indicate the dyes marketed under the registered trade-mark "Indigosols".

As a yellow dye I may use, for instance, an alkali metal salt of the sulfuric acid ester of the leuco compound of the dye as obtainable according to the process disclosed in the German patent specification No. 430,558, as a blue dye an alkali metal salt of the sulfuric acid ester of the leuco compound of the dye as obtainable according to German patent specification No. 228,960, and, finally, as a red dye an alkali metal salt of the sulfuric acid ester of the leuco compound of the dye as obtainable according to German patent specification No. 239,094.

The following example serves to illustrate my invention:

20 grams of the sodium salt of the phosphoric acid ester of the leuco compound of the deystuff manufactured according to the German patent specification No. 430,558 from benzanthrone and phthalic anhydride, are dissolved in 800 cc. of water and filtered. After adding 200 cc. of glycerin, a paper web is impregnated with this solution, dried in the air and exposed under the negative taken behind a blue screen. A yellow picture is obtained which can be fixed by treating with water or a warm soap solution. The fixed picture is bathed in a 2 per cent solution of the sodium salt of the sulfuric acid ester of the leuco compound of the 4.4'-dimethyl-thioindigo, which contains glycerin, and then dried. The picture is then exposed under a correspondent negative taken behind a green screen, whereby a purple-colored picture is obtained which is fixed as indicated above. Then the paper is impregnated with a two per cent solution of the leuco ester of 4.4'-dichloro-5.5'-dibromindigo containing glycerin, and exposed under the correspondent negative taken behind a red screen.

If the material known under the registered trade-mark "Cellophane" is impregnated with these leuco-esters or with such a similar shade, transparencies are obtained. It is likewise possible in this case to produce the partial pictures in the fundamental colors on three single foils which are subsequently superimposed.

What I claim is:—

1. The process of preparing multi-colored photographic pictures which comprises impregnating supports with esters of leuco compounds of vat dyestuffs, exposing said impregnated supports behind color part negatives and fixing the positives thus obtained by washing out the unchanged leuco ester.

2. The process of preparing multi-colored photographic pictures which comprises impregnating supports with esters of leuco compounds of vat dyestuffs, exposing said impregnated supports behind color part negatives, fixing the positives thus obtained by washing out the unchanged leuco ester and uniting the same so as to form a multi-color picture.

3. The process of preparing multi-colored photographic pictures which comprises impregnating supports with esters of leuco compounds of vat dyestuffs and an oxidizing agent, exposing said impregnated supports behind color part negatives, fixing the positives thus obtained by washing out the unchanged leuco ester and uniting the same so as to form a multi-color picture.

4. The process of preparing multi-colored photographic pictures which comprises impregnating a support several times with an ester of a leuco compound of a vat dyestuff, exposing the impregnated support in accordance with the consecutive impregnations behind a color part-negative taken with the intercalation of a color filter colored complementary to the vat dyestuff, and fixing the single color pictures produced successively by washing out the unchanged leuco ester.

5. The process of preparing multi-colored photographic pictures which comprises impregnating a support several times with an ester of a leuco compound of a vat dyestuff, and an oxidizing agent, exposing the impregnated support in accordance with the consecutive impregnations behind a color part-negative taken with the intercalation of a color filter colored complementary to the vat dyestuff, and fixing the single color pictures produced successively by washing out the unchanged leuco ester.

6. The process of preparing multi-colored photographic pictures which comprises impregnating a support three times with an ester of a leuco compound of a vat dyestuff, exposing the impregnated support after each impregnation behind a negative taken with a color filter colored complementary to the vat dyestuff, and fixing each single picture obtained by washing out the unchanged leuco ester.

7. The process of preparing multi-colored photographic pictures which comprises impregnating a support three times with an ester of a leuco compound of a vat dyestuff and an oxidizing agent, exposing the impregnated support after each impregnation behind a negative taken with a color filter colored complementary to the vat dyestuff, and fixing each single picture obtained by washing out the unchanged leuco ester.

8. A photographic material for two or multi-color pictures comprising a support impregnated with an ester of a leuco compound of a vat dyestuff.

9. A photographic material for two or multi-color pictures comprising a support impregnated with an ester of a leuco compound of a vat dyestuff and an oxidizing agent.

10. A photographic material for two or multi-color pictures comprising cellophane impregnated with an ester of a leuco compound of a vat dyestuff.

11. A photographic material for two or multi-color pictures comprising cellophane impregnated with an ester of a leuco compound of a vat dyestuff and an oxidizing agent.

BRUNO WENDT.